(12) United States Patent
Zhang et al.

(10) Patent No.: US 10,237,901 B2
(45) Date of Patent: Mar. 19, 2019

(54) METHOD AND APPARATUS FOR CONNECTING WITH CONTROLLED SMART DEVICE, AND STORAGE MEDIUM

(71) Applicant: XIAOMI INC., Haidian District, Beijing (CN)

(72) Inventors: Pengfei Zhang, Beijing (CN); Yongfeng Xia, Beijing (CN); Jun Su, Beijing (CN)

(73) Assignee: XIAOMI INC., Beijing (CN)

( * ) Notice: Subject to any disclaimer, the term of this patent is extended or adjusted under 35 U.S.C. 154(b) by 162 days.

(21) Appl. No.: 15/359,104

(22) Filed: Nov. 22, 2016

(65) Prior Publication Data

US 2017/0156166 A1     Jun. 1, 2017

(30) Foreign Application Priority Data

Nov. 27, 2015  (CN) .......................... 2015 1 0850228

(51) Int. Cl.
| | | |
|---|---|---|
| *H04W 72/10* | (2009.01) | |
| *H04W 76/11* | (2018.01) | |
| *G08C 17/02* | (2006.01) | |
| *H04L 12/26* | (2006.01) | |

(52) U.S. Cl.
CPC ............ *H04W 76/11* (2018.02); *G08C 17/02* (2013.01); *H04L 43/12* (2013.01); *H04W 72/10* (2013.01); *G08C 2201/63* (2013.01); *Y02D 70/00* (2018.01)

(58) Field of Classification Search
CPC ...... H04L 43/12; Y02D 70/00; G08C 2201/63
See application file for complete search history.

(56) References Cited

U.S. PATENT DOCUMENTS

| | | | |
|---|---|---|---|
| 2008/0180228 A1 | 7/2008 | Wakefield et al. | |
| 2009/0156123 A1 | 6/2009 | Kim | |
| 2011/0105028 A1* | 5/2011 | Yu | H04W 48/18 455/41.2 |
| 2014/0304381 A1* | 10/2014 | Savolainen | H04L 41/0806 709/222 |

(Continued)

FOREIGN PATENT DOCUMENTS

| | | |
|---|---|---|
| CN | 102800196 A | 11/2012 |
| CN | 103001840 A | 3/2013 |

(Continued)

OTHER PUBLICATIONS

Search Report issued in corresponding PCT Application No. PCT/CN2016/082688, dated Jul. 28, 2016, 13 pages.

(Continued)

*Primary Examiner* — Kent K Krueger
(74) *Attorney, Agent, or Firm* — Arch & Lake LLP

(57) ABSTRACT

A method and an apparatus are provided for connecting with a controlled smart device. The method includes: obtaining wireless communication schemes, each of which allows connecting with the controlled smart device currently; determining a first wireless communication scheme with a highest priority among the wireless communication schemes, according to priorities corresponding respectively to the wireless communication schemes; and sending a connecting request to the controlled smart device, by adopting the first wireless communication scheme with the highest priority.

18 Claims, 8 Drawing Sheets

(56) References Cited

U.S. PATENT DOCUMENTS

| | | |
|---|---|---|
| 2015/0271808 A1 | 9/2015 | Liang |
| 2016/0267780 A1 | 9/2016 | Krishna et al. |

FOREIGN PATENT DOCUMENTS

| | | | |
|---|---|---|---|
| CN | 103561480 A | 2/2014 | |
| CN | 103607780 A | 2/2014 | |
| CN | 103856993 A | 6/2014 | |
| CN | 10458199 | * 12/2014 | ............ H04W 76/14 |
| CN | 104581999 A | 4/2015 | |
| CN | 104731066 A | 6/2015 | |
| CN | 105392213 A | 3/2016 | |
| JP | 2003169375 | 6/2003 | |
| JP | 2013509781 A | 3/2013 | |
| JP | 2015139092 A | 7/2015 | |
| RU | 130098 U1 | 7/2013 | |
| WO | 2015073107 A1 | 5/2015 | |
| WO | 2015074374 A1 | 5/2015 | |

OTHER PUBLICATIONS

Official Action issued in corresponding Russian Patent Application No. 2016132684/07(050675), dated Sep. 28, 2017, 10 pages.

Extended European Search Report issued in connection with corresponding EP Application No. 16180885, dated Mar. 30, 2017, 7 pgs.

Notification of Reasons for Refusal (including English Translation) issued in corresponding Japanese Application No. 2016-549052 dated Feb. 6, 2018, 6 pages.

International Preliminary Report on Patentability (including English translation) issued in corresponding International Application No. PCT/CN2016/082688, dated May 29, 2018, 11 pages.

Japanese Second Office Action (including English translation) issued in corresponding JP Application No. 2016-549052, dated Jun. 12, 2018, 7 pages.

Chinese First Office Action issued in corresponding CN Application No. 201510850228.4 dated Apr. 10, 2018, 6 pages.

* cited by examiner

METHOD AND APPARATUS FOR CONNECTING WITH CONTROLLED SMART DEVICE, AND STORAGE MEDIUM

CROSS-REFERENCE TO RELATED APPLICATION

This application is based upon and claims the priority from the Chinese Patent Application No. 201510850228.4, filed on Nov. 27, 2015, which is incorporated herein by reference in its entirety.

TECHNICAL FIELD

The present disclosure relates to the technical field of communications and computer processing, and more particularly, to a method and an apparatus for connecting with a controlled smart device, and a storage medium.

BACKGROUND

Along with development of electronic technology, electronic devices such as handsets, televisions and refrigerators emerge endlessly. Provided with a network connecting function, the electronic devices become increasingly smart. A handset can establish network connections with one or more devices such as a television, a refrigerator, etc. and perform a variety of smart controls over the devices.

SUMMARY

According to a first aspect of the present disclosure, there is provided a method for connecting with a controlled smart device. The method includes: obtaining wireless communication schemes, each of which allows connecting with a controlled smart device currently; determining a first wireless communication scheme with a highest priority among the wireless communication schemes, according to priorities corresponding respectively to the wireless communication schemes; and sending a connecting request to the controlled smart device, by adopting the first wireless communication scheme with the highest priority.

According to a second aspect of the present disclosure, there is provided an apparatus for connecting with a controlled smart device. The apparatus includes: a processor; and a memory for processing instructions executable by the processor. The processor is configured to: obtain wireless communication schemes, each of which allows connecting with the controlled smart device currently; determine a first wireless communication scheme with a highest priority among the wireless communication schemes according to priorities corresponding respectively to the wireless communication schemes; and send a connecting request to the controlled smart device, by adopting the first wireless communication scheme with the highest priority.

According to a third aspect of the present disclosure, there is provided a non-transitory computer-readable storage medium having stored therein instructions that, when executed by a processor of a mobile terminal, causes the mobile terminal to perform a method for connecting with a controlled smart device, the method including: obtaining wireless communication schemes, each of which allows connecting with a controlled smart device currently; determining a first wireless communication scheme with a highest priority among the wireless communication schemes, according to priorities corresponding respectively to the wireless communication schemes; and sending a connecting request to the controlled smart device, by adopting the first wireless communication scheme with the highest priority.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
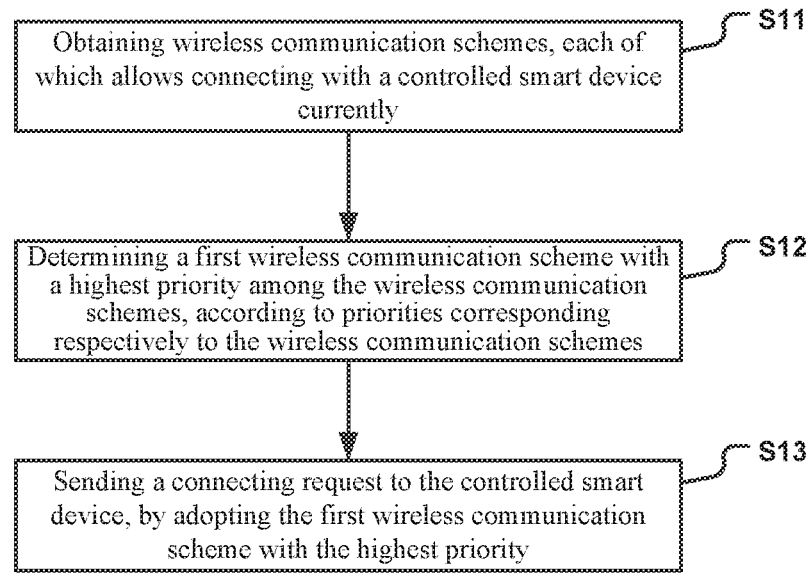
FIG. 1 is a flow chart illustrating a method for connecting with a controlled smart device according to an exemplary embodiment.

The terminology used in the present disclosure is for the purpose of describing exemplary embodiments only and is not intended to limit the present disclosure. As used in the present disclosure and the appended claims, the singular forms "a," "an" and the are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Reference will now be made in detail to exemplary embodiments, examples of which are illustrated in the accompanying drawings. The following description refers to the accompanying drawings in which the same numbers in different drawings represent the same or similar elements unless otherwise presented. The embodiments set forth in the following description of exemplary embodiments do not represent all embodiments consistent with the disclosure. Instead, they are merely examples of apparatuses and methods consistent with aspects related to the disclosure as recited in the appended claims.

In related arts, various digital devices in a smart home are connected together, and a plurality of functions and means such as automatic control and programmable timing control are provided. Automation of the devices provides great convenience for a user.

The traditional smart home adopts wired connecting technology, but is hard to popularize and poor in control effect due to its characteristics such as complex wiring and high cost. In recent years, along with rapid development of mobile interact, the wired connecting technology is gradually replaced with the wireless connecting technology, and due to its characteristics such as being free of wiring, higher mobility, higher degree of freedom, lower cost and better control effect, the wireless connecting technology rapidly gains popularity in the market and among most users.

When the smart home adopts wireless connecting technology, smart devices may be connected and controlled through various wireless communication schemes such as Bluetooth, short messaging, mobile communication network, WiFi and the like. These connecting technologies are different in use cost and energy consumption. When a smart device is connected by adopting a proper connecting manner, not only is the energy consumption saved and expenditure reduced, but also pollution to the surrounding environment and ecologic system may be reduced. Therefore, how to adopt a proper manner to establish a connection with the smart device becomes a problem to be solved urgently.

FIG. 1 is a flow chart illustrating a method for connecting a controlled smart device according to an exemplary embodiment. As shown in FIG. 1, the method may be implemented by a mobile terminal and includes the following steps S11-S13.

In step S11, the mobile terminal obtains currently available wireless communication schemes, each of which allows connecting with a controlled smart device.

In step S12, a first wireless communication scheme with a highest priority is determined among the wireless communication schemes according to priorities corresponding respectively to the wireless communication schemes.

In step S13, the mobile terminal sends a connecting request to the controlled smart device by adopting the first wireless communication scheme with the highest priority.

For example, in a process of wirelessly connecting with the controlled smart device, the various wireless communication schemes introduced in foregoing description are different in cost. For example, when the controlled smart device is connected via WiFi, a wireless router is needed first; in some cases, it is also needed to subscribe to a broadband service. As another example, when the controlled smart device is connected via Bluetooth, power consumption of the mobile terminal is greatly increased due to functioning of the Bluetooth. As a further example, when the controlled smart device is connected via the mobile communication network, data traffic or communication fee for the mobile terminal will be incurred. As yet a further example, when the controlled smart device is connected by the short message, short message fee for the mobile terminal will be incurred. In such case, in the present embodiment, a priority is preset for each wireless communication scheme and then wireless communication schemes are sorted according to the preset priorities. For example, the sorting result according to the preset priorities is as follows: the WiFi communication scheme, the Bluetooth communication scheme, the mobile communication network communication scheme and the short message communication scheme. When the controlled smart device can be connected via the WiFi communication scheme, the WiFi communication scheme is adopted preferentially since, in case the wireless router exists, the WiFi connecting is the lowest in cost and the connecting can be realized with less electricity consumption. Since the Bluetooth communication scheme only increases the power consumption of the mobile terminal, the Bluetooth communication scheme is adopted preferentially when the controlled smart device cannot be connected via the WiFi communication scheme. However, the Bluetooth is initially designed for short range transmission of signals in a range of smaller than 10 m, so the controlled smart device may not be connected via Bluetooth when at a farther distance. Then, the mobile communication network or short message may be selected for connecting with the controlled smart, device. Whether the controlled smart device is connected via the mobile communication network or the short message can be determined according to the data plan of the mobile terminal. When the mobile terminal subscribes to a data plan and the remaining data allowance is sufficient, the controlled smart device is connected via adopting the mobile communication network; When the mobile terminal does not subscribe to a data plan and the mobile communication network is adopted for the connecting, communication fee for the mobile terminal will be charged, which is higher than that incurred by the short message connecting. Therefore, when the mobile terminal does not subscribe to a data plan, it is regarded that the mobile communication network cannot be used, and the controlled smart device is connected via short message.

In one or more embodiments, when the controlled smart device to be connected with is determined, the wireless communication scheme with the highest preset priority is adopted according to the above sorting result of communication schemes to send a connecting request to the controlled smart device. The priorities may be adjusted according to factors such as network environment, data plan, etc. The network environment factors may include network bandwidth, network power consumption, additional cost for the network connection, etc. The data plan factors may include data connection speed, data charge rate, available data in the data plan, etc.

It should be noted that the present embodiment may also be implemented as the following steps A1-A2.

In step A1, the mobile terminal determines a controlled smart device to be controlled.

In step A2, the mobile terminal sends a connecting request to the controlled smart device by adopting a wireless communication scheme with a highest priority.

When the foregoing steps A1-A2 are adopted to implement the solution, the connecting request is sent to the controlled smart device by adopting the wireless communication scheme with the highest preset priority, thereby achieving the same technical effects as the solution including the steps S11-S13.

In the one or more embodiments, wireless communication schemes each of which allows connecting with the controlled smart device currently are obtained first, a wireless communication scheme with the highest priority is then determined among the wireless communication schemes according to priorities corresponding respectively to the wireless communication schemes, and finally a connecting request is sent to the controlled smart device by adopting the wireless communication scheme with the highest priority. As such, a more proper manner can be selected for establishing a connection with the controlled smart device, thereby reducing the user's expenditure and the device's power consumption.

In the present disclosure, the controlled smart device includes one of the following: a controlled smart device which has started a corresponding application; or a preset controlled smart device corresponding to a controlled smart device identifier contained in a preset first set of controlled smart device; or a controlled smart device corresponding to a controlled smart device identifier contained in a second set of controlled smart device, the set of controlled smart devices being obtained from a router.

Figure 2:
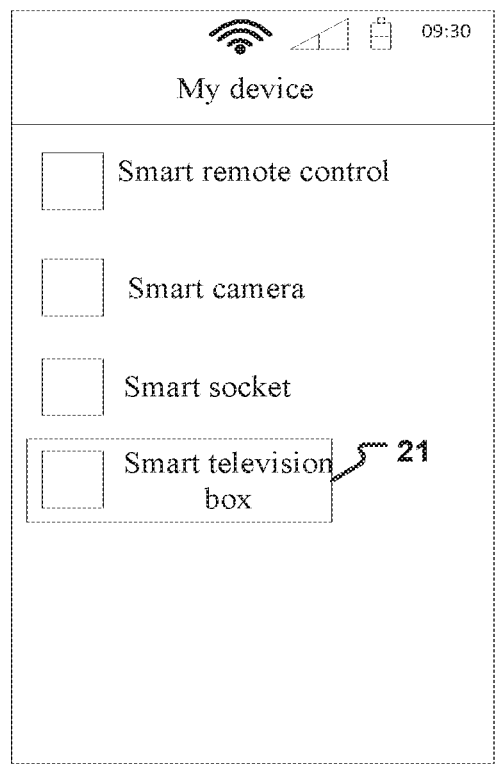
FIG. 2 is a schematic diagram illustrating an interface for implementing a method for connecting with a controlled smart device according to an exemplary embodiment.

For example, the controlled smart device may be a controlled smart device displayed in a list in an application interface of a terminal for controlling the smart home, or a controlled smart device preset in the terminal. Through the interface of the terminal, an identifier of the controlled smart device may be checked. As shown in FIG. 2, a smart television box 21 is clicked and selected, then connecting manners supported by the smart television box 21 may be checked. The set of controlled smart devices in FIG. 2 is pre-configured in the terminal by a configuration file. Additionally or alternatively, a checking request for checking a list of controlled smart devices may be sent to a router, and the list of the controlled smart devices fed back by the router according to the checking request is received from the router. As such, a controlled smart device corresponding to a controlled smart device identifier contained in the second set of controlled smart device can be obtained.

The technical solution provided in the embodiment of the present disclosure may have following beneficial effects. By designating various controlled smart devices, the variety of the controlled smart devices is enhanced.

Figure 3:
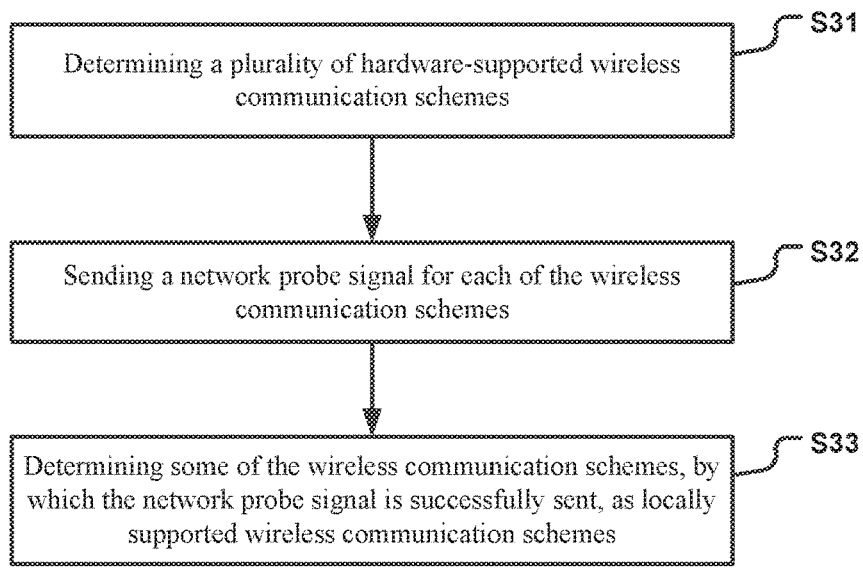
FIG. 3 is a flow chart illustrating a method for connecting with a controlled smart device according to an exemplary embodiment.

In one embodiment, as shown in FIG. 3, before obtaining the wireless communication schemes each of which allows connecting with the controlled smart device currently, the following step B1 may be further executed.

In step B1, the wireless communication schemes each of which allows the connecting are determined.

The step B1 may be implemented as the following steps S31-S33.

In step S31, a plurality of hardware-supported wireless communication schemes are determined.

In step S32, a network probe signal is sent for each of the determined wireless communication schemes.

In step S33, some of the determined plurality of wireless communication schemes, by which the network probe signal is successfully sent, are determined as locally supported wireless communication schemes.

Before the step S31, the wireless communication schemes respectively supported by the mobile terminal and the controlled smart device may be determined using following methods.

Method One

The wireless communication schemes supported by hardware of the mobile terminal are determined by checking a device list in a device manager. For example, it may be checked whether the device list in the device manager of the mobile terminal contains a wireless local area network (WLAN) function, that is, whether the mobile terminal supports the WiFi function. When the device list contains WLAN, it is determined that the mobile terminal supports the WiFi function and the WiFi connecting manner is a hardware-supported connecting manner, and then the WiFi connecting manner may be regarded as a locally supported wireless communication scheme. As another example, it nay be checked whether the device list in the device manager of the mobile terminal contains a Bluetooth function. When the device list contains the Bluetooth function, it is determined that the Bluetooth connecting manner is a communication scheme supported by the hardware of the mobile terminal, and then the Bluetooth connecting manner may be regarded as a locally supported wireless communication scheme.

Method Two

It is determined whether a wireless communication scheme is practically usable. For example, after determining that the hardware of the mobile terminal supports the WiFi connecting manner, the mobile terminal detects whether a WiFi network covers a current environment. When the WiFi network covers the current environment, it is detected whether the controlled smart device to be controlled is connected to the WiFi network. When the controlled smart device to be controlled is connected to the WiFi network, the mobile terminal determines that the WiFi connecting manner is practically usable. As another example, after it is determined that the hardware of the mobile terminal supports the Bluetooth connecting manner, it is detected whether the controlled smart device to be controlled supports the Bluetooth. When the controlled smart device to be controlled supports the Bluetooth, it is detected whether the controlled smart device to be controlled is in the Bluetooth coverage area of the mobile terminal. When the controlled smart device to be controlled is in the Bluetooth coverage area of the mobile terminal, it is determined that the Bluetooth connecting manner is practically usable.

In the method, the mobile communication network connecting manner and the short message connecting manner are considered practically usable by default. For example, the locally supported connecting manners are the Bluetooth connecting manner, the mobile communication network connecting manner and the short message connecting manner. A preset priority order of all possible wireless communication schemes is as follows: the WiFi connecting manner, the Bluetooth connecting manner, the mobile communication network connecting manner and the short message connecting manner. Therefore, among the locally supported wireless communication schemes, the wireless communication scheme with the highest priority is the Bluetooth connecting manner. Accordingly, a connecting request is sent to the controlled smart device to be controlled by adopting the Bluetooth. As such, the wireless communication scheme with the highest priority can be determined among the locally supported wireless communication schemes based on the preconfigured priorities of all possible wireless communication schemes. Then, the connecting request is sent to the controlled smart device by the locally supported wireless communication scheme with the highest priority, thereby allowing a more proper manner to be selected for establishing a connection with the controlled smart device.

In the one or more embodiments, after the practically usable wireless communication schemes of the mobile terminal and the controlled smart device are determined, it is verified whether these wireless communication schemes are effective, that is, whether these wireless communication schemes may enable the mobile terminal to connect with the controlled smart device to be connected with. The verification ensures that only the wireless communication schemes enabling the mobile terminal to connect with the controlled smart device to be connected with can be regarded as effective wireless communication schemes. For example, after a plurality of hardware-supported wireless communication schemes are determined, a network probe signal is sent for each communication scheme. If the network probe signal is successfully sent, then the wireless communication scheme corresponding to the network probe signal is determined as a locally supported wireless communication scheme.

The technical solution provided in the present disclosure may have the following beneficial effects. By sending a network probe signal for each wireless communication scheme and determining the wireless communication scheme by which the network probe signal is successfully sent as the wireless communication scheme which allows the connecting, a simple and practicable method is provided for determining whether a wireless communication scheme is a locally supported wireless communication scheme.

Figure 4:
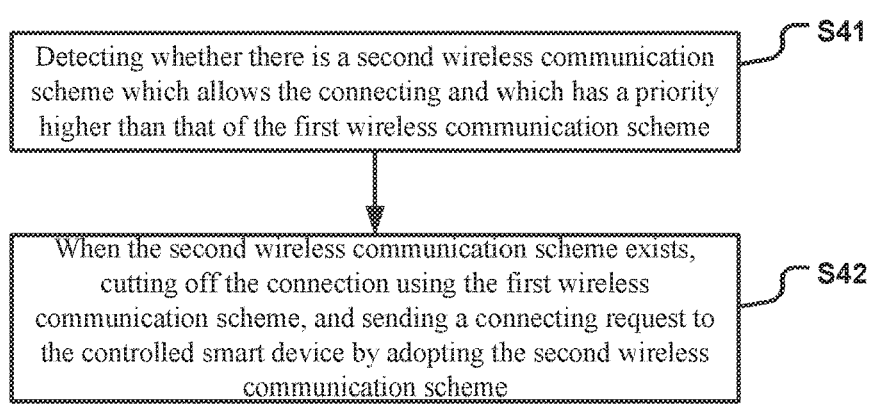
FIG. 4 is a flow chart illustrating a method for connecting with a controlled smart device according to an exemplary embodiment.

In one embodiment, as shown in FIG. 4, after the step S13, the method may further execute the following steps S41-S42.

In step S41, the mobile terminal may detect whether there is a second wireless communication scheme which allows the connecting and which has a priority higher than the first wireless communication scheme.

In step S42, when determining that the second wireless communication scheme exists, the connection using the first wireless communication scheme is cut off and a connecting request is sent to the controlled smart device by adopting the second wireless communication scheme.

For example, when the first wireless communication scheme is currently used for the connecting, it is detected in real time whether a second wireless communication scheme becomes available, where the second wireless communication allows the connecting and which has a priority higher than the currently used first wireless communication scheme. When detecting that the second wireless communication scheme appears, the mobile terminal cuts off the connection using the currently used first wireless communication scheme, and adopts the second wireless communication scheme to send a connecting request to the controlled smart device.

For example, when the mobile terminal sends the connecting request to the controlled smart device the first time, a wireless router is not turned on. Then, no WiFi signal exists in the current environment, and the mobile terminal adopts the Bluetooth scheme with the highest priority to connect with the controlled smart device. While the controlled smart device is connected via the Bluetooth, the wireless router is turned on. At the moment, WiFi appears in the current environment, then the Bluetooth connection is cut off, and the WiFi scheme with a higher priority is adopted to send a connecting request to the controlled smart device.

The technical solution provided in the one or more embodiments of the present disclosure may have the following beneficial effects. When it is found that a communication scheme with a priority higher than the current communication scheme allows the connecting, the connection using the current communication scheme is cut off, and a sending request is sent by adopting the communication scheme with the higher priority. As such, the connecting manner with the highest priority can be selected to a greater extent, and the user's expenditure and the device's power consumption can be further reduced.

Figure 5:
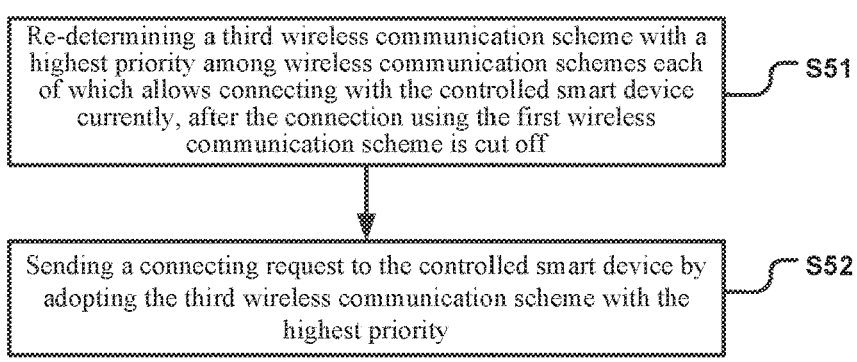
FIG. 5 is a flow chart illustrating a method for connecting with a controlled smart device according to an exemplary embodiment.

In one embodiment, as shown in FIG. 5, before sending the connecting request to the controlled smart device by adopting the second wireless communication scheme in step S42, the method may execute the following steps S51-S52.

In step S51, a third wireless communication scheme with a highest priority is re-determined among wireless communication schemes each of which allows connecting with the controlled smart device currently, after the connection using the first wireless communication scheme is cut off.

In step S52, a connecting request is sent to the controlled smart device, by adopting the third wireless communication scheme with the highest priority.

In the present embodiment, after the connection using the first communication scheme is cut off, wireless communication schemes which allow connecting with the controlled smart device are re-obtained. Among the wireless communication schemes which allow connecting with the controlled smart device, the wireless communication scheme with the highest priority is determined and adopted for the connecting. For example, when the mobile terminal connects with the controlled smart device the first time, the terminal is in a state where the mobile network and the Bluetooth functions are not switched on, and no WiFi network covers the current environment. Therefore, the short message scheme is adopted to connect with the controlled smart device. However, when the terminal detects that the mobile network function is switched on, the short message connection is cut off, since the priority of the mobile network wireless communication scheme is higher than that of the short message wireless communication scheme. Instead of connecting with the controlled smart device by the mobile network immediately after the short message connection is cut off, communication schemes which allow connecting with the controlled smart device currently are re-obtained. At the moment, if a WiFi network covers the current environment, then WiFi is the wireless communication scheme with the highest priority among the wireless communication schemes which allow connecting with the controlled smart device currently. Accordingly, a connecting request is sent to the controlled smart device by WiFi. That is, although the mobile network communication scheme triggers the disconnection between the terminal and the controlled smart device, WiFi has the highest priority among the re-obtained wireless communication schemes which allow connecting with the controlled smart device currently. Therefore, in the present embodiment, a connecting request is sent to the controlled smart device by adopting the WiFi scheme with the highest priority instead of the mobile network communication scheme.

The technical solution provided in the embodiment of the present may have the following beneficial effects. After the connection is cut off, the communication scheme with the highest priority is re-determined, thereby ensuring that the device is always connected using the communication scheme with the highest priority. Accordingly, the user's expenditure and the device's power consumption can be saved to the maximum extent.

Figure 6:
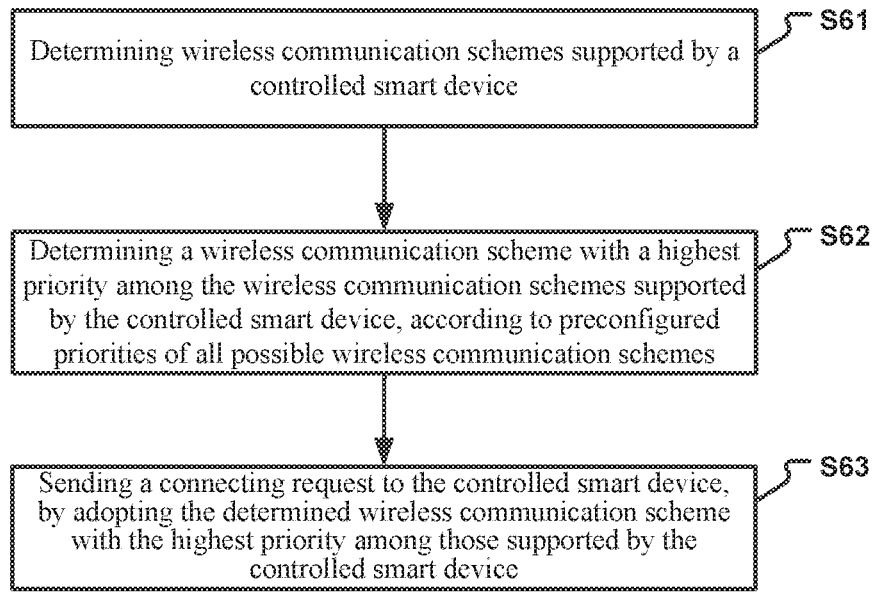
FIG. 6 is a flow chart illustrating a method for connecting with a controlled smart device according to an exemplary embodiment.

In one embodiment, as shown in FIG. 6, the step S12 may be implemented as the following steps S61-S63.

In step S61, wireless communication schemes supported by a controlled smart device are determined.

In step S62, a wireless communication scheme with a highest priority is determined among the wireless communication schemes supported by the controlled smart device, according to preconfigured priorities of all possible wireless communication schemes.

In step S63, a connecting request is sent to the controlled smart device, by adopting the determined wireless communication scheme with the highest priority among those supported by the controlled smart device.

In the present embodiment, the wireless communication schemes supported by the controlled smart device may be directly obtained. For example, a configuration file recording wireless communication schemes supported by the controlled smart device is preconfigured. When the wireless communication schemes supported by the controlled smart device need to be determined, they can be obtained from the preconfigured configuration file. In addition, the wireless communication schemes supported by the controlled smart device may also be obtained from a router. After the wireless communication schemes supported by the controlled smart device are determined, the wireless communication scheme with the highest priority may be determined among the wireless communication schemes supported by the controlled smart device according to the preconfigured priorities of all possible wireless communication schemes. For example, the connecting manners supported by the controlled smart device include a WiFi connecting manner, a Bluetooth connecting manner and a mobile communication network connecting manner; and the preset priority order of all possible wireless communication schemes is as follows: the WiFi connecting manner, the Bluetooth connecting manner, the mobile communication network connecting manner and a short message connecting manner. Accordingly, the WiFi connecting manner can be determined as the wireless communication scheme with the highest priority among the wireless communication schemes supported by the controlled smart device, and is thus adopted to send the connecting request to the controlled smart device to be controlled.

The technical solution provided in the one or more embodiments of the present disclosure may have the following beneficial effects. By determining the wireless communication scheme with the highest priority among the wireless communication schemes supported by the controlled smart device based on the wireless communication schemes supported by the controlled smart device and the priorities of all possible wireless communication schemes, a connecting request can be sent to the controlled smart device by the wireless communication scheme with the highest priority, thereby allowing connecting with the controlled smart device in a more proper manner.

Figure 7:
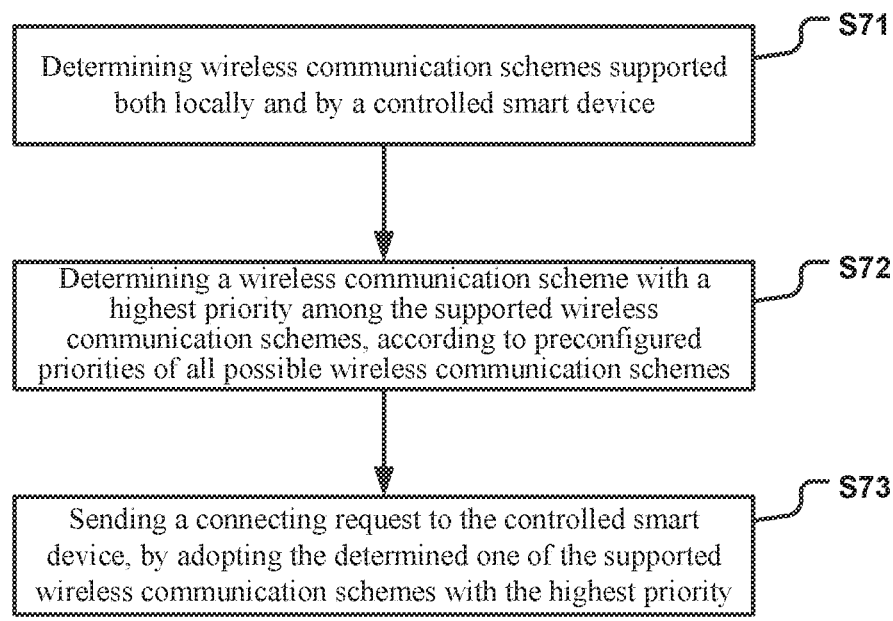
FIG. 7 is a flow chart illustrating a method for connecting with a controlled smart device according to an exemplary embodiment.

In one embodiment, as shown in FIG. 7, the step S12 may also be implemented as the following steps S71-S73.

In step S71, wireless communication schemes supported both locally and by a controlled smart device are determined.

In step S72, a wireless communication scheme with a highest priority is determined among the supported wireless communication schemes, according to preconfigured priorities of all possible wireless communication schemes.

In step S73, a connecting request is sent to the controlled smart device, by adopting the determined one of the supported wireless communication schemes with the highest priority.

For example, in the present embodiment, the locally supported wireless communication schemes include a WiFi connecting manner, a mobile communication network manner and a short message connecting manner, while the wireless communication schemes supported by the controlled smart device include a Bluetooth connecting manner, a mobile communication network manner and a short message connecting manner. Then, the wireless communication schemes supported both locally and by the controlled smart device are the mobile communication network manner and the short message connecting manner. The preset priority order of all possible wireless communication schemes is follows: the WiFi connecting manner, the Bluetooth connecting manner, the mobile communication network connecting manner and the short message connecting manner. Therefore, the priority order of wireless communication schemes with the highest priority supported both locally and by the controlled smart device is: the mobile communication network connecting manner and the short message connecting manner. Hence, the supported wireless communication scheme with the highest priority is the mobile communication network connecting manner, which is used for sending the connecting request to the controlled smart device.

The technical solution provided in the one or more embodiments of the present disclosure may have the following beneficial effects. By determining the wireless communication scheme with the highest priority among the wireless communication schemes supported both locally and by the controlled smart device based on the wireless communication scheme supported and the preconfigured priorities of all possible wireless communication schemes, the controlled smart device can be connected via using the wireless communication scheme with the highest priority among the supported wireless communication schemes, thereby allowing connecting with the controlled smart device in a more proper manner.

In one or more embodiments, the wireless communication schemes include: Bluetooth, mobile network and short message.

For example, in the present embodiment, various common wireless communication schemes are listed, which include the WiFi connecting manner, the Bluetooth connecting manner, the mobile communication network connecting manner and the short message connecting manner. Of course, it can be appreciated that the manners for connecting with the controlled smart device include but are not limited to the foregoing listed manners. For example, the connecting may be performed by a radiofrequency technology, an infrared technology, a Zigbee protocol, and a near field communication (NFC) technology, or the like. The foregoing examples are merely intended to more clearly describe the present disclosure rather than limiting it.

The technical solution provided in the one or more embodiments of the present disclosure may have the following beneficial effects. By providing a plurality of wireless communication schemes, the variety of the manners for connecting with the controlled smart device is improved, and the range of selectable manners for connecting with the controlled smart device is enlarged.

Figure 8:
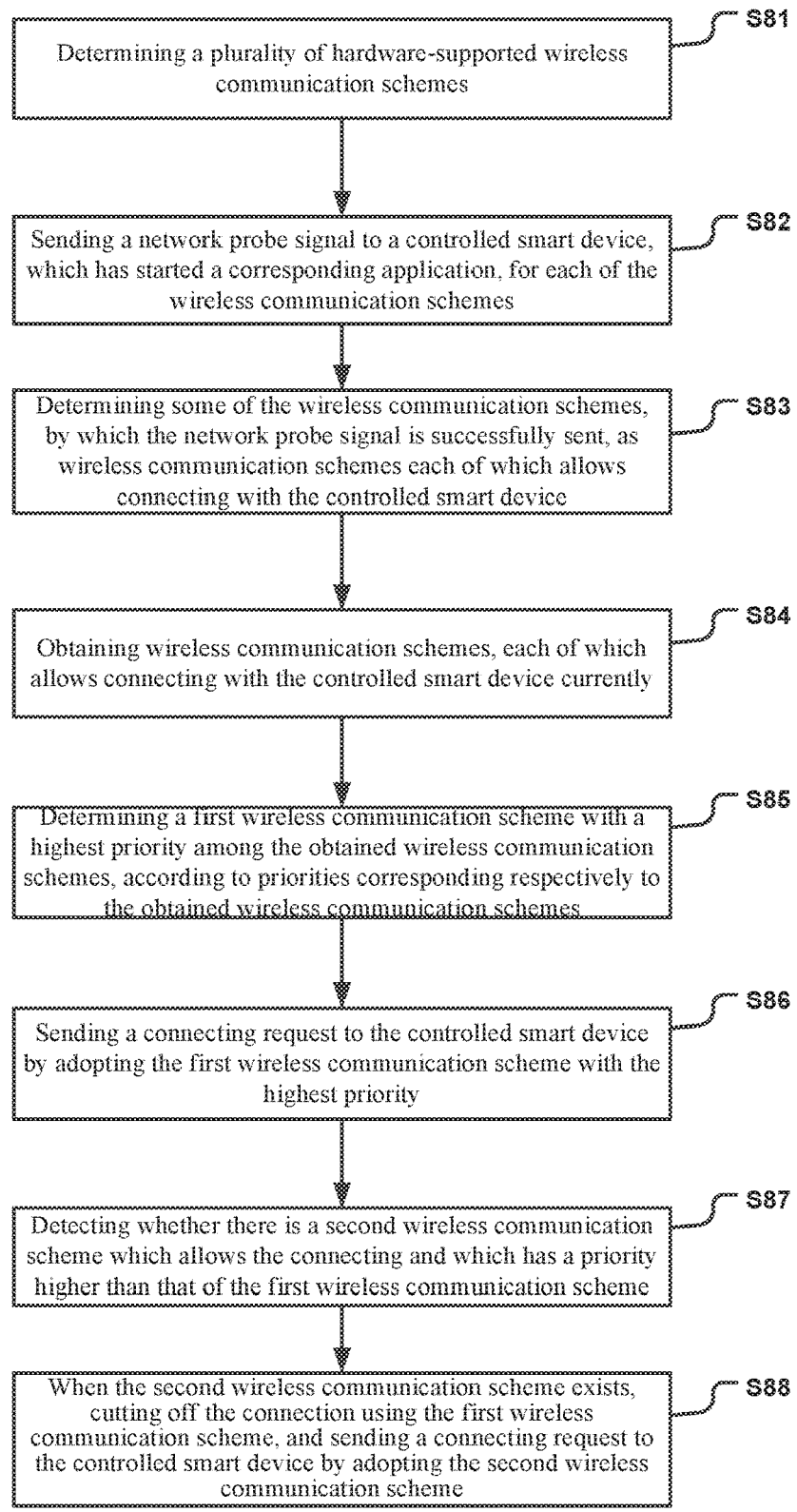
FIG. 8 is a flow chart illustrating a method for connecting with a controlled smart device according to an exemplary embodiment.

FIG. 8 is a flow chart illustrating a method for connecting with a controlled smart device according to an exemplary embodiment. As shown in FIG. 8, the method may be implemented by a mobile terminal and may include the following steps S81-S88.

In step S81, a plurality of hardware-supported wireless communication schemes are determined.

In step S82, a network probe signal is sent to a controlled smart device, which has started a corresponding application, for each of the determined wireless communication schemes.

In step S83, some of the determined plurality of wireless communication schemes, by which the network probe signal is successfully sent, are determined as wireless communication schemes each of which allows the mobile terminal to connect with the controlled smart device.

In step S84, wireless communication schemes, each of which allows connecting with the controlled smart device currently, are obtained.

In step S85, a first wireless communication scheme with a highest priority is determined among the obtained wireless communication schemes, according to priorities corresponding respectively to the obtained wireless communication schemes.

In step S86, a connecting request is sent to the controlled smart device by adopting the first wireless communication scheme with the highest priority.

In step S87, it is detected whether there is a second wireless communication scheme which allows the connecting and which has a priority higher than that of the first wireless communication scheme.

In step S88, when the second wireless communication scheme exists, the connection using the first wireless communication scheme is cut off, and a connecting request is sent to the controlled smart device by adopting the second wireless communication scheme.

The above embodiment introduces a solution, where when a wireless communication scheme with a priority higher than that of the current wireless communication scheme is found, the connection using the current wireless communication scheme is cut off, and the found wireless communication scheme with the higher priority is adopted to send a connecting request to the controlled smart device.

Figure 9:
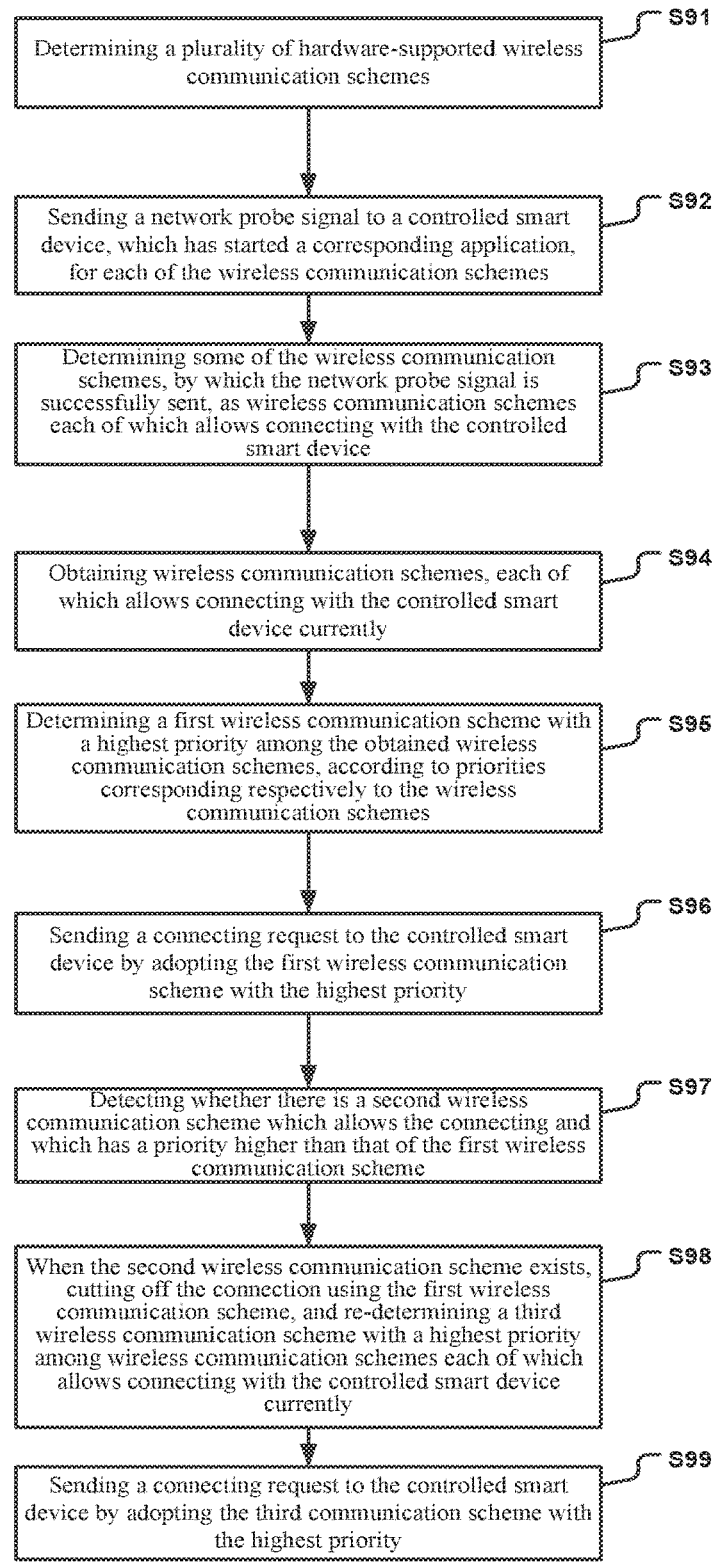
FIG. 9 is a flow chart illustrating a method for connecting with a controlled smart device according to an exemplary embodiment.

FIG. 9 is a flow chart illustrating a method for connecting with a controlled smart device according to an exemplary embodiment. As shown in FIG. 9, the method may be implemented by a mobile terminal and may include the following steps S91-S99.

In step S91, a plurality of hardware-supported wireless communication schemes are determined.

In step S92, a network probe signal is sent to a controlled smart device, which has started a corresponding application, for each of the determined plurality of wireless communication schemes.

In step S93, some of the determined plurality of wireless communication scheme, by which the network probe signal is successfully sent, is determined as wireless communication schemes each of which allows the mobile terminal to connect with the controlled smart device.

In step S94, wireless communication schemes, each of which allows connecting with the controlled smart device currently, are obtained.

In step S95, a first wireless communication scheme with a highest priority is determined among the obtained wireless communication schemes, according to priorities corresponding respectively to the obtained wireless communication schemes.

In step S96, a connecting request is sent to the controlled smart device by adopting the first wireless communication scheme with the highest priority.

In step S97, it is detected whether there is a second wireless communication scheme which allows the connecting and which has a priority higher than that of the first wireless communication scheme.

In step S98, when the second wireless communication scheme exists, the connection using the first wireless communication scheme is cut off, and a third wireless communication scheme with a highest priority is re-determined among wireless communication schemes each of which allows connecting with the controlled smart device currently.

In step S99, a connecting request is sent to the controlled smart device by adopting the third communication scheme with the highest priority.

The above embodiment introduces a solution, where: when a wireless communication scheme with a priority higher than that of the current wireless communication scheme is found, the connection using the current wireless communication scheme is cut off; wireless communication schemes, which allow connecting with the controlled smart device currently, are re-obtained; and a wireless communication scheme with the highest priority is selected, among the re-obtained wireless communication schemes which allow connecting with the controlled smart device currently, to send a connecting request to the controlled smart device.

The process implemented by a mobile terminal to connect with a controlled smart device is described from above introduction. In the following, the internal structure and functions of the mobile terminal is described below.

Figure 10:
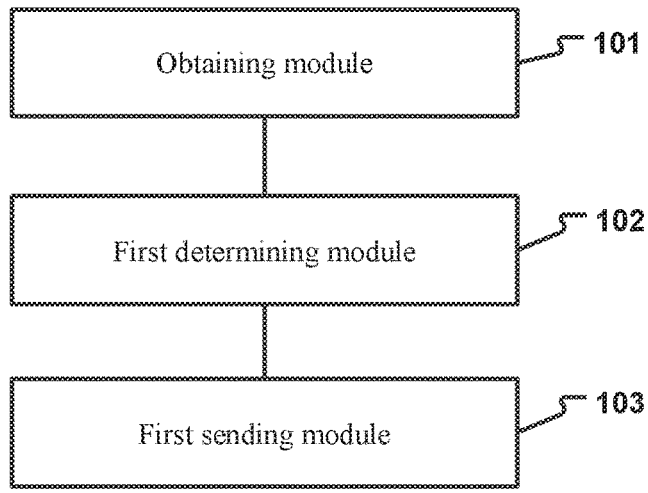
FIG. 10 is a block diagram illustrating an apparatus for connecting with a controlled smart device according to an exemplary embodiment.

FIG. 10 is a block diagram illustrating an apparatus for connecting with a controlled smart device according to an exemplary embodiment. Referring to FIG. 10, the apparatus includes following modules.

An obtaining module 101 is configured to obtain wireless communication schemes each of which allows connecting with a controlled smart device currently.

A first determining module 102 is configured to determine a first wireless communication scheme with a highest priority among the wireless communication schemes, according to priorities corresponding respectively to the wireless communication schemes obtained by the obtaining module 101.

A first sending module 103 is configured to send a connecting request to the controlled smart device, by adopting the first wireless communication scheme with the highest priority determined by the first determining module 102.

For example, the obtaining module 101 obtains the wireless communication schemes, which allow connecting with the controlled smart device currently, as a WiFi connecting manner, a Bluetooth connecting manner, a mobile communication network connecting manner and a short message connecting manner. The obtaining module 101 sends the obtained wireless communication schemes to the first determining module 102. The first determining module 102 determines the WiFi communication scheme with the highest priority according to the priorities corresponding respectively to the wireless communication schemes obtained by the obtaining module 101, and sends to the first sending module 103 a message conveying that the wireless communication scheme with the highest priority is the WiFi communication scheme. When receiving from the first determining module the message conveying that the wireless communication scheme with the highest priority is the WiFi communication scheme, the first sending module 103 sends a connecting request to the controlled smart device by adopting the WiFi communication scheme.

The technical solution provided in the embodiment of the present disclosure may have the following beneficial effects. The first sending module can send the connecting request to the controlled smart device according to the first wireless communication scheme with the highest priority determined by the first determining module, thereby allowing a more proper manner to be selected for establishing a connection with the controlled smart device. As a result, the user's expenditure and the device's power consumption can be reduced.

Figure 11:
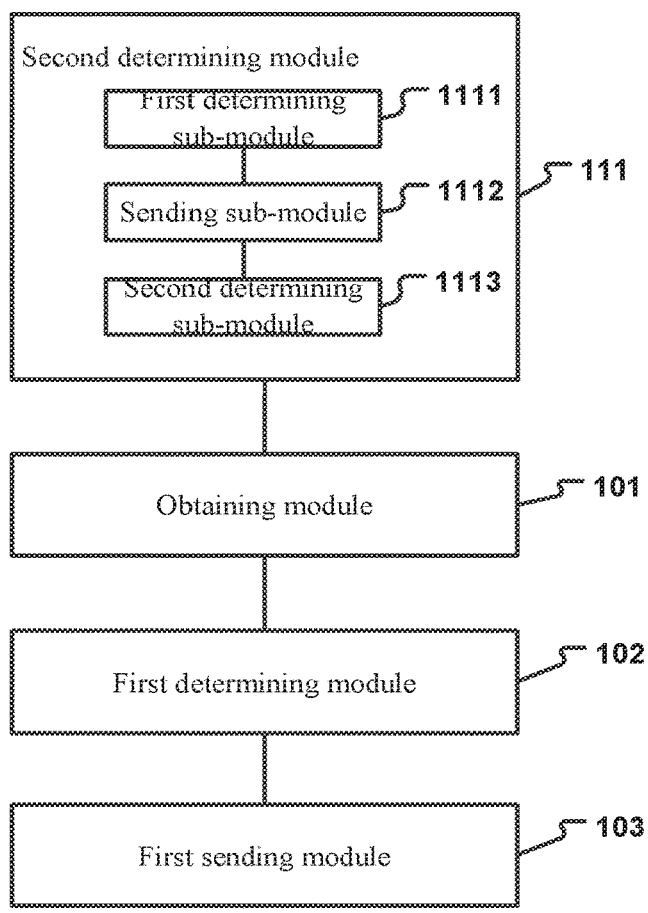
FIG. 11 is a block diagram illustrating an apparatus for connecting with a controlled smart device according to an exemplary embodiment.

In one embodiment, as shown in FIG. 11, the apparatus further includes: a second determining module 111 configured to determine communication schemes each of which allows the connecting. The second determining module 111 includes a first determining sub-module 1111, a sending sub-module 1112 and a second determining sub-module 1113.

The first determining sub-module 1111 is configured to determine a plurality of hardware-supported wireless communication schemes.

The sending sub-module 1112 is configured to send a network probe signal for each of the wireless communication schemes determined by the determining sub-module 1111.

The second determining sub-module 1113 is configured to determine some of the determined plurality of wireless communication schemes, by which the network probe signal is successfully sent by the sending sub-module 1112, as the wireless communication schemes each of which allows the connecting.

The first determining sub-module 1111 in the second determining module 111 may determine the hardware-supported wireless communication schemes by checking a device list in a device manager or by detecting them in a current environment, and sends the plurality of hardware-supported wireless communication schemes to the sending sub-module 1112. After receiving the wireless communication schemes sent by the first determining sub-module 1111, the sending sub-module 1112 sends a network probe signal for each of the wireless communication schemes. The second determining sub-module 1113 receives a feedback that the network probe signal is successfully sent for the respective one of the wireless communication schemes. When the feedback that the network probe signal is successfully sent is received, the communication scheme corresponding to the network probe signal is determined as a locally supported wireless communication scheme.

The technical solution provided in the one or more embodiments of the present disclosure may have the following beneficial effects. The sending sub-module sends a network probe signal for each wireless communication scheme, and the second determining sub-module determines the wireless communication scheme by which the network probe signal is successfully sent as a wireless communication scheme which allows the connecting, thereby providing a simple and practicable apparatus for determining whether a wireless communication scheme is a locally supported wireless communication scheme.

Figure 12:
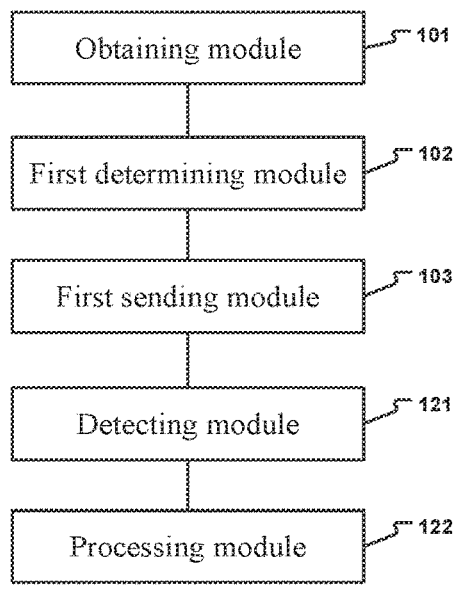
FIG. 12 is a block diagram illustrating an apparatus for connecting with a controlled smart device according to an exemplary embodiment.

In one embodiment, as shown in FIG. 12, the apparatus further includes: a detecting module 121 and a processing module 122.

The detecting module 121 is configured to detect whether there is a second wireless communication scheme which allows the connecting and which has a priority higher than that of the first wireless communication scheme.

The processing module 122 is configured to, when the detecting module 122 detects that the second wireless communication scheme exists, cut off the connection using the first wireless communication scheme and send a connecting request to the controlled smart device by adopting the second wireless communication scheme.

For example, when the mobile terminal sends a connecting request to the controlled smart device the first time, a wireless router is not turned on. Then, no WiFi signal exists in a current environment, and the mobile terminal adopts the Bluetooth scheme with the highest priority to connect with the controlled smart device. While the controlled smart device is connected via the Bluetooth communication scheme, the detecting module 121 detects in real time whether a second wireless communication scheme which allows the connecting and which has a priority higher than that of the first wireless communication scheme appears. When detecting a WiFi signal in the current environment, the detecting module 121 sends to the processing module 122 a message conveying that a WiFi communication scheme with the priority higher than that of the Bluetooth manner appears. When receiving the message, the processing module 122 cuts off the connection with the controlled smart device using the Bluetooth scheme, and adopts the WiFi scheme to send a connecting request to the controlled smart device.

The technical solution provided in the one or more embodiments of the present disclosure may have the following beneficial effects. When the detecting module detects that a communication scheme with a priority higher than that of the current communication scheme allows the connecting, the processing module cuts off the connection using the current communication scheme and adopts the communication scheme with the higher priority to send a connecting request to the controlled smart device. As such, the connecting manner with the highest priority can be selected to a greater extent, and the user's expenditure and the device's power consumption can be further reduced.

Figure 13:
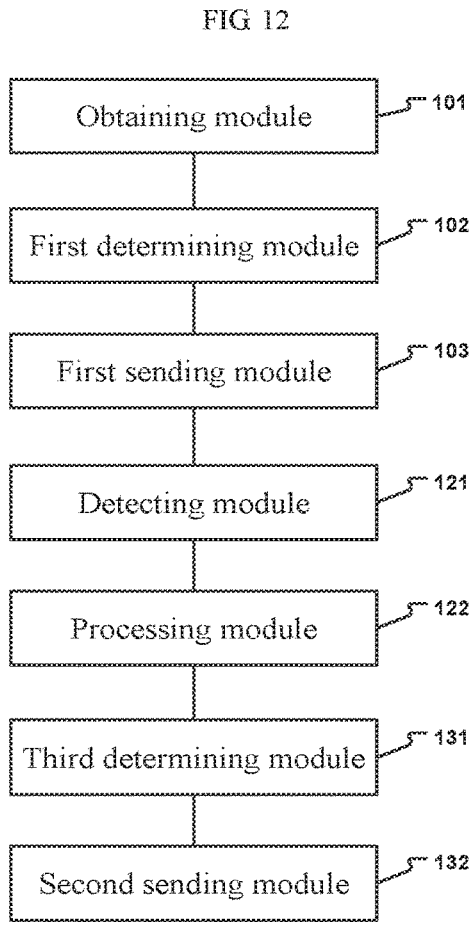
FIG. 13 is a block diagram illustrating an apparatus for connecting with a controlled smart device according to an exemplary embodiment.

In one embodiment, as shown in FIG. 13, the apparatus further includes a third determining module 131 and a second sending module 132.

The third determining module 131 is configured to re-determine a third wireless communication scheme with a highest priority among wireless communication schemes each of which allows connecting with the controlled smart device currently, after the connecting of the first wireless communication scheme is disconnected.

The second sending module 132 is configured to send a connecting request to the controlled smart device by adopting the third wireless communication scheme with the highest priority determined by the third determining module 131.

For example, when the mobile terminal connects with the controlled smart device the first time, the terminal is in a state where the mobile network and the Bluetooth functions are not switched on, and no WiFi network covers the current environment. Therefore, the short message scheme is adopted to connect with the controlled smart device. However, when the detecting module 121 detects that the mobile network function is switched on, the processing module 122 cuts off the short message connection, since the priority of the mobile network wireless communication scheme is higher than that of the short message wireless communication scheme. After the short message connection is cut off, the third determining module 131 re-determines wireless communication schemes which allow connecting with the controlled smart device currently. At the moment, if a WiFi network covers the current environment, the third determining module 131 detects that WiFi is the wireless communication scheme with the highest priority among the wireless communication schemes which allow connecting with the controlled smart device currently. Accordingly, the third determining module 131 instructs the second sending module 132 connected therewith to send a connecting request to the controlled smart device by WiFi.

The technical solution provided in the one or more embodiments of the present disclosure may have the following beneficial effects. After the processing module cuts off the connection using the current communication scheme, the third determining module re-determines the communication scheme with the highest priority, thereby ensuring that the device is always connected using the communication scheme with the highest priority. Accordingly, the user's expenditure and the device's power consumption can be saved to the maximum extent.

For the apparatus in foregoing embodiments, specific operation manners of respective modules have been described in detail in related method embodiments, and will not be elaborated herein.

Figure 14:
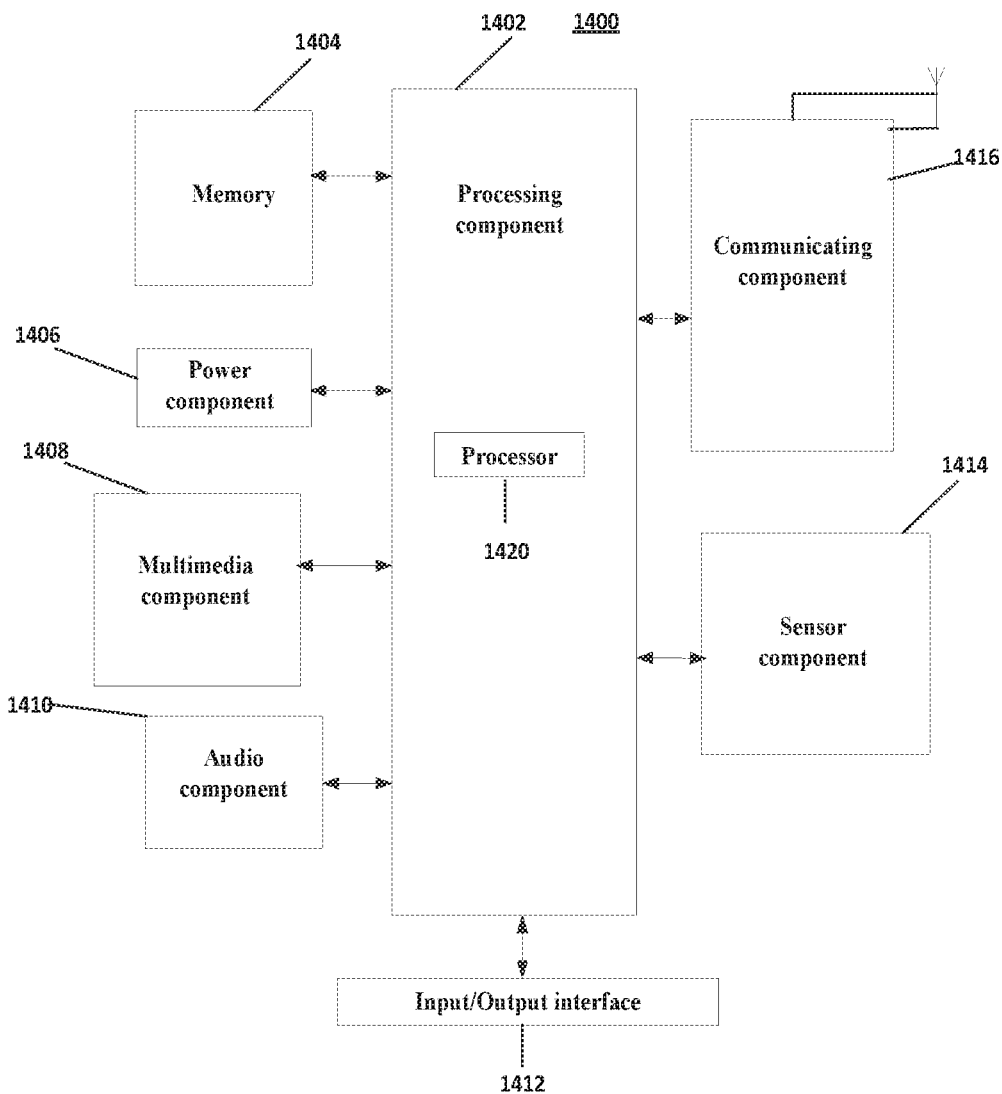
FIG. 14 is a block diagram illustrating an apparatus for connecting with a controlled smart device according to an exemplary embodiment.

FIG. 14 is a block diagram illustrating an apparatus 1400 for connecting with a controlled smart device according to an exemplary embodiment. For example, the apparatus 1400 may be a mobile phone, a computer, a digital broadcasting terminal, a messaging device, a gaming console, a tablet device, a medical device, exercise equipment, a personal digital assistant or the like.

Referring to FIG. 14, the apparatus 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the apparatus 1400, such as the operations associated with display, phone calls, data communications, camera operations, and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 14014 and the processing component 1402.

The memory 1404 is configured to store various types of data to support the operation of the apparatus 1400. Examples of such data include instructions for any applications or methods operated on the apparatus 1400, contact data, phonebook data, messages, pictures, video, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the apparatus 1400. The power component 1406 may include a power management system, one or more power sources, and any other components associated with the generation, management, and distribution of power in the apparatus 1400.

The multimedia component 1408 includes a screen providing an output interface between the apparatus 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 1408 includes a front camera and/or a rear camera. The front camera and the rear camera may receive an external multimedia datum while the apparatus 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone ("MIC") configured to receive an external audio signal when the apparatus 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the apparatus 1400. For instance, the sensor component 1414 may detect an open/closed status of the apparatus 1400, relative positioning of components, e.g., the display and the keypad, of the apparatus 1400, a change in position of the apparatus 1400 or a component of the apparatus 1400, a presence or absence of user contact with the apparatus 1400, an orientation or an acceleration/deceleration of the apparatus 1400, and a change in temperature of the apparatus 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate communication, wired or wirelessly, between the apparatus 1400 and other devices. The apparatus 1400 may access a wireless network based on a communication standard, such as WiFi, 2G, or 3G, or a combination thereof. In one exemplary embodiment, the communication component 1416 receives a broadcast signal or broadcast associated information from an external broadcast management system via a broadcast channel. In one exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In the disclosure, each module or sub-module may include memory (shared, dedicated, or group) that stores code or instructions that can be executed by one or more processors. The module or sub-module may take the form of a packaged functional hardware unit designed for use with other components, a portion of a program code (e.g., software or firmware) executable by the processing component 1402, the processing circuitry that usually performs a particular function of related functions, or a self-contained hardware or software component that interfaces with a larger system, for example.

In exemplary embodiments, there is also provided a non-transitory computer-readable storage medium including instructions, such as included in the memory 1404, executable by the processor 1420 in the apparatus 1400, for performing the above-described methods. For example, the non-transitory computer-readable storage medium may be a ROM, a RAM, a CD-ROM, a magnetic tape, a floppy disc, an optical data storage device, and the like.

In an embodiment, there is provided an apparatus for connecting with a controlled smart device includes: a processor; and a memory for processing instructions executable by the processor. The processor is configured to: obtain wireless communication schemes, each of which allows connecting with the controlled smart device currently; determine a first wireless communication scheme with a highest priority among the wireless communication schemes, according to priorities corresponding respectively to the wireless communication schemes; and send a connecting request to the controlled smart device, by adopting the first wireless communication scheme with the highest priority.

The processor may be further configured such that the controlled smart device includes: a controlled smart device which has started a corresponding application; or a controlled smart device corresponding to a controlled smart device identifier contained in a preset first set of controlled smart devices; or a controlled smart device corresponding to a controlled smart device identifier contained in a second set of controlled smart, devices, the second set of controlled smart devices being obtained from a router.

The processor may be further configured to, before obtaining the wireless communication schemes each of which allows connecting with the controlled smart device currently, determine the wireless communication schemes each of which allows the connecting. The determining the wireless communication schemes each of which allows the connecting includes: determining a plurality of hardware-supported wireless communication schemes; sending a network probe signal for each of the wireless communication schemes; and determining some of the wireless communication schemes, by which the network probe signal is successfully sent, as the wireless communication schemes each of which allows the connecting.

The processor may be further configured to: detect whether there is a second wireless communication scheme which allows the connecting and which has a priority higher than that of the first wireless communication scheme; and cut off the connection using the first wireless communication scheme and send a connecting request to the controlled smart device by adopting the second wireless communication scheme, when the second wireless communication scheme exists.

The processor may be further configured to: re-determine a third wireless communication scheme with a highest priority among wireless communication schemes each of which allows connecting with the controlled smart device currently, after the connection using the first wireless communication scheme is cut off and send a connecting request to the controlled smart device, by adopting the third wireless communication scheme with the highest priority.

The processor may be further configured such that the wireless communication schemes include any two or more of wireless fidelity (WiFi), Bluetooth, mobile network and short message.

In an embodiment, there is provided a non-transitory computer readable storage medium. When executed by a processor of a mobile terminal, instructions in the storage medium cause the mobile terminal to execute a method for connecting with a controlled smart device. The method includes: obtaining wireless communication schemes each of which allows connecting with the controlled smart device currently; determining a first wireless communication scheme with a highest priority among the wireless communication schemes according to priorities corresponding respectively to the wireless communication schemes; and sending a connecting request to the controlled smart device by adopting the first wireless communication scheme with the highest priority.

The controlled smart device may include: a controlled smart device which has started a corresponding application; or a preset controlled smart device corresponding to a controlled smart device identifier contained in a preset first set of controlled smart devices; or a controlled smart device corresponding to a controlled smart device identifier contained in a second set of controlled smart devices, the second set of controlled smart devices being obtained from a router.

Before obtaining the wireless communication schemes each of which allows connecting with the controlled smart device currently, the method may further include: determining the wireless communication schemes each of which allows the connecting. The determining the wireless communication schemes each of which allows the connecting includes: determining a plurality of hardware-supported wireless communication schemes; sending a network probe signal for each of the determined wireless communication schemes; and determining some of the determined plurality of wireless communication schemes, by which the network probe signal is successfully sent, as the wireless communication schemes each of which allows the connecting.

The method may further include: detecting whether there is a second wireless communication scheme which allows the connecting and which has a priority higher than that of the first wireless communication scheme; and cutting off the connection using the first wireless communication scheme and sending a connecting request to the controlled smart device by adopting the second wireless communication scheme, when the second wireless communication scheme exists.

The sending the connecting request to the controlled smart device by adopting the preset wireless communication scheme with the highest priority may include: determining wireless communication schemes supported both locally and by the controlled smart device; determining a wireless communication scheme with a highest priority among the supported wireless communication schemes, according to preconfigured priorities of all possible wireless communication schemes; and sending a connecting request to the controlled smart device, by adopting the determined supported wireless communication scheme with the highest priority.

The method may further include: re-determining a third wireless communication scheme with a highest priority among wireless communication schemes each of which allows connecting with the controlled smart device currently, after the connection using the first wireless communication scheme is cut off; and sending a connecting request to the controlled smart device, by adopting the third wireless communication scheme with the highest priority.

The wireless communication scheme may include any two or more of wireless fidelity (WiFi), Bluetooth, mobile network and short message.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for connecting with a controlled smart device, comprising:
   determining, by a mobile terminal, a plurality of wireless communication schemes supported by hardware of the mobile terminal;
   sending a network probe signal for each of the determined plurality of wireless communication schemes;
   determining some of the determined plurality of wireless communication schemes as the wireless communication schemes each of which allows connecting with the controlled smart device when receiving a feedback that the network probe signal is successfully sent;
   obtaining, by the mobile terminal, wireless communication schemes, each of which allows connecting with the controlled smart device currently;
   determining, by the mobile terminal, a first wireless communication scheme with a highest priority among the wireless communication schemes, according to priorities corresponding respectively to the wireless communication schemes; and
   sending, by the mobile terminal, a connecting request to the controlled smart device, by adopting the first wireless communication scheme with the highest priority.

2. The method according to claim 1, further comprising one of the following:
   identifying the controlled smart device that has started a corresponding application;
   identifying the controlled smart device corresponding to a controlled smart device identifier contained in a preset first set of controlled smart devices; and
   identifying the controlled smart device corresponding to a controlled smart device identifier contained in a second set of controlled smart devices, the second set of controlled smart devices being obtained from a router.

3. The method according to claim 1, further comprising:
   detecting whether there is a second wireless communication scheme that allows connecting with the controlled smart device and has a priority higher than the first wireless communication scheme; and
   when the second wireless communication scheme exists, cutting off the connection using the first wireless communication scheme, and sending a connecting request to the controlled smart device by adopting the second wireless communication scheme.

4. The method according to claim 3, further comprising:
   after cutting off the connection using the first wireless communication scheme, re-determining a third wireless communication scheme with a highest priority among wireless communication schemes each of which allows connecting with the controlled smart device currently; and
   sending a connecting request to the controlled smart device, by adopting the third wireless communication scheme with the highest priority.

5. The method according to claim 1, wherein the wireless communication schemes include at least two of the following elements: wireless fidelity (WiFi), Bluetooth, mobile network, and short message.

6. The method according to claim 1, wherein the priorities are adjusted according to network environment and data plan of the mobile terminal.

7. An apparatus for connecting with a controlled smart device, comprising:
   a processor; and
   a memory for processing instructions executable by the processor,
   wherein the processor is configured to
   determine a plurality of wireless communication schemes supported by hardware of the apparatus;
   send a network probe signal for each of the determined wireless communication schemes;
   determine some of the determined plurality of wireless communication schemes as the wireless communication schemes each of which allows connecting with the controlled smart device when receiving a feedback that the network probe signal is successfully sent;
   obtain wireless communication schemes, each of which allows connecting with the controlled smart device currently;
   determine a first wireless communication scheme with a highest priority among the wireless communication schemes according to priorities corresponding respectively to the wireless communication schemes; and
   send a connecting request to the controlled smart device, by adopting the first wireless communication scheme with the highest priority.

8. The apparatus of claim 7, wherein the processor is further configured to perform one of the following:
- identifying the controlled smart device that has started a corresponding application;
- identifying the controlled smart device corresponding to a controlled smart device identifier contained in a preset first set of controlled smart devices; and
- identifying the controlled smart device corresponding to a controlled smart device identifier contained in a second set of controlled smart devices, the second set of controlled smart devices being obtained from a router.

9. The apparatus of claim 7, wherein the processor is further configured to:
- detect whether there is a second wireless communication scheme that allows the connecting and which has a priority higher than the first wireless communication scheme; and
- when the second wireless communication scheme exists, cut off the connection using the first wireless communication scheme, and send a connecting request to the controlled smart device by adopting the second wireless communication scheme.

10. The apparatus of claim 9, wherein the processor is further configured to:
- after the connection using the first wireless communication scheme is cut off, re-determine a third wireless communication scheme with a highest priority among wireless communication schemes each of which allows connecting with the controlled smart device currently; and
- send a connecting request to the controlled smart device, by adopting the third wireless communication scheme with the highest priority.

11. The apparatus of claim 7, wherein the wireless communication schemes include at least two of the following elements: wireless fidelity (WiFi), Bluetooth, mobile network and short message.

12. The apparatus of claim 7, wherein the priorities are adjusted according to network environment and data plan of the apparatus.

13. A non-transitory computer-readable storage medium having stored therein instructions that, when executed by a processor of a mobile terminal, causes the mobile terminal to perform a method for connecting with a controlled smart device, the method comprising:
- determining a plurality of wireless communication schemes supported by hardware of the mobile terminal;
- sending a network probe signal for each of the determined wireless communication schemes;
- determining some of the determined plurality of wireless communication schemes as the wireless communication schemes each of which allows connecting with the controlled smart device when receiving a feedback that the network probe signal is successfully sent;
- obtaining wireless communication schemes, each of which allows connecting with a controlled smart device currently;
- determining a first wireless communication scheme with a highest priority among the wireless communication schemes, according to priorities corresponding respectively to the wireless communication schemes; and
- sending a connecting request to the controlled smart device, by adopting the first wireless communication scheme with the highest priority.

14. The storage medium of claim 13, wherein the method further comprises one of the following:
- identifying the controlled smart device which has started a corresponding application;
- identifying the controlled smart device corresponding to a controlled smart device identifier contained in a preset first set of controlled smart devices; and
- identifying the controlled smart device corresponding to a controlled smart device identifier contained in a second set of controlled smart devices, the second set of controlled smart devices being obtained from a router.

15. The storage medium of claim 13, wherein the method further comprises:
- detecting whether there is a second wireless communication scheme which allows the connecting and which has a priority higher than the first wireless communication scheme; and
- when the second wireless communication scheme exists, cutting off the connection using the first wireless communication scheme, and sending a connecting request to the controlled smart device by adopting the second wireless communication scheme.

16. The storage medium of claim 15, wherein the method further comprises:
- after the connection using the first wireless communication scheme is cut off, re-determining a third wireless communication scheme with a highest priority among wireless communication schemes each of which allows connecting with the controlled smart device currently; and
- sending a connecting request to the controlled smart device, by adopting the third wireless communication scheme with the highest priority.

17. The storage medium of claim 13, wherein the wireless communication schemes include at least two of the following elements: wireless fidelity (WiFi), Bluetooth, mobile network and short message.

18. The storage medium of claim 13, wherein the priorities are adjusted according to network environment and data plan of the mobile terminal.

* * * * *